(12) United States Patent
Huynh

(10) Patent No.: US 10,509,994 B1
(45) Date of Patent: Dec. 17, 2019

(54) RING FOR USE IN NEAR FIELD COMMUNICATION (NFC) AND METHOD OF MAKING SAME

(71) Applicant: Chi Huynh, San Dimas, CA (US)

(72) Inventor: Chi Huynh, San Dimas, CA (US)

( * ) Notice: Subject to any disclaimer, the term of this patent is extended or adjusted under 35 U.S.C. 154(b) by 0 days.

(21) Appl. No.: 16/426,429

(22) Filed: May 30, 2019

Related U.S. Application Data

(60) Provisional application No. 62/845,019, filed on May 8, 2019.

(51) Int. Cl.
*H04B 5/00* (2006.01)
*G06K 19/077* (2006.01)

(52) U.S. Cl.
CPC . *G06K 19/07762* (2013.01); *G06K 19/07779* (2013.01); *H04B 5/0031* (2013.01); *H04B 5/0081* (2013.01)

(58) Field of Classification Search
CPC ...... H04B 5/0081; H04B 5/0025; H04B 1/03; H04B 1/08; H04B 5/0031; G06K 19/07762; G06K 19/07779
See application file for complete search history.

(56) References Cited

U.S. PATENT DOCUMENTS

| | | |
|---|---|---|
| D182,205 S | 2/1958 | Schreiber |
| 4,080,803 A | 3/1978 | Suzuki |
| 4,608,838 A | 9/1986 | Gardner |
| 6,868,804 B1 | 3/2005 | Huisma et al. |
| 7,596,967 B2 | 10/2009 | Ostfeld |
| 7,962,369 B2 | 6/2011 | Rosenberg |
| 7,980,469 B2 | 7/2011 | Matsuo |
| D647,419 S | 10/2011 | Wong |
| 8,131,645 B2 | 3/2012 | Lin |
| D662,437 S | 6/2012 | Verdeille |
| 8,240,568 B2 | 8/2012 | Matsuo |
| 8,280,305 B2 | 10/2012 | Tamura |
| D675,952 S | 2/2013 | Dholakiya |
| D680,023 S | 4/2013 | Ho |
| 8,768,250 B2 | 7/2014 | Ma |
| 8,942,672 B2 | 1/2015 | Renard |
| D727,200 S | 4/2015 | Kwon |
| 9,042,817 B2 | 5/2015 | Tse |
| 9,082,267 B2 | 7/2015 | Rosenberg |
| 9,092,813 B2 | 7/2015 | Pappas |
| D754,025 S | 4/2016 | Baid |
| 9,444,524 B2 | 9/2016 | Huynh |
| 9,456,063 B2 | 9/2016 | Mercando et al. |

(Continued)

FOREIGN PATENT DOCUMENTS

| | | |
|---|---|---|
| CN | 102204516 B | 12/2012 |
| CN | 102332106 B | 1/2014 |

(Continued)

*Primary Examiner* — Andrew Wendell
(74) *Attorney, Agent, or Firm* — Wagenknecht IP Law Group PC

(57) ABSTRACT

A near field communication (NFC) ring and method of making a ring capable of NFC, the method including the steps of: providing an electrically conductive band with two ends separated by a through slit, fitting an NFC coil having an NFC antenna and NFC chip against a sleeve that is smaller in circumference than the NFC coil and is not electrically conductive; and attaching the sleeve to the inside of the band, thereby forming an NFC enabled ring.

8 Claims, 5 Drawing Sheets

(56) References Cited

U.S. PATENT DOCUMENTS

| | | |
|---|---|---|
| 9,489,612 B2 | 11/2016 | Boulby |
| D786,119 S | 5/2017 | Huynh |
| 9,824,310 B2 | 11/2017 | Huynh |
| 10,108,900 B2 | 10/2018 | Huynh |
| 10,257,680 B2 | 4/2019 | Quarto et al. |
| 10,317,940 B2 * | 6/2019 | Eim .................. G06F 1/163 |
| 2004/0112087 A1 | 6/2004 | Bishop |
| 2004/0250570 A1 | 12/2004 | Huynh |
| 2007/0288249 A1 | 12/2007 | Rowe et al. |
| 2008/0015013 A1 | 1/2008 | Gelman et al. |
| 2008/0016913 A1 | 1/2008 | Ray et al. |
| 2010/0147226 A1 | 6/2010 | Tsengas |
| 2011/0248088 A1 | 10/2011 | Edouard et al. |
| 2012/0215935 A1 | 8/2012 | Woods |
| 2012/0218184 A1 * | 8/2012 | Wissmar ............... G06F 3/0346 345/158 |
| 2012/0242481 A1 | 9/2012 | Gernandt et al. |
| 2013/0011025 A1 | 1/2013 | Liu |
| 2013/0234899 A1 | 9/2013 | Pope et al. |
| 2013/0254159 A1 | 9/2013 | Thramann et al. |
| 2014/0102136 A1 | 4/2014 | Warren |
| 2014/0116085 A1 | 5/2014 | Lam |
| 2014/0195675 A1 | 7/2014 | Silver |
| 2014/0198037 A1 | 7/2014 | Leica et al. |
| 2014/0292477 A1 | 10/2014 | Ahmadloo |
| 2014/0298434 A1 | 10/2014 | Prchal |
| 2015/0026296 A1 | 1/2015 | Halpern |
| 2015/0042450 A1 | 2/2015 | McLear |
| 2015/0134552 A1 | 5/2015 | Engels |
| 2015/0140927 A1 | 5/2015 | Chen |
| 2015/0206046 A1 | 7/2015 | Aibazov |
| 2015/0213734 A1 | 7/2015 | Glickman |
| 2015/0220109 A1 | 8/2015 | von Badinski et al. |
| 2015/0249485 A1 | 9/2015 | Ouyang et al. |
| 2015/0256386 A1 | 9/2015 | Palmer |
| 2015/0263791 A1 | 9/2015 | Chein |
| 2015/0294214 A1 | 10/2015 | Boulby |
| 2015/0349556 A1 | 12/2015 | Mercando et al. |
| 2016/0020833 A1 * | 1/2016 | Ting .................... H04B 5/0081 455/41.1 |
| 2016/0064804 A1 | 3/2016 | Kim et al. |
| 2016/0066812 A1 | 3/2016 | Cheng et al. |
| 2016/0110639 A1 | 4/2016 | Finn et al. |
| 2016/0112097 A1 | 4/2016 | Huynh |
| 2016/0125209 A1 | 5/2016 | Meyers |
| 2016/0196487 A1 | 7/2016 | Huynh |
| 2017/0277990 A1 * | 9/2017 | Tokunaga ............ G06K 19/077 |
| 2018/0219279 A1 * | 8/2018 | Beaucourt ............. H01Q 1/273 |
| 2019/0053055 A1 * | 2/2019 | Neyrou ............. G06K 19/0739 |
| 2019/0197385 A1 * | 6/2019 | Finn ................. G06K 19/07794 |
| 2019/0230487 A1 | 7/2019 | Quarto et al. |

FOREIGN PATENT DOCUMENTS

| | | |
|---|---|---|
| GB | 2559621 A | 8/2018 |
| JP | 2007091453 A | 12/2007 |
| JP | 3176725 U | 7/2012 |
| KR | 20030039941 | 5/2003 |
| WO | 2005/015986 A2 | 2/2005 |
| WO | 2014/016609 A1 | 1/2014 |
| WO | 2016/089965 A1 | 6/2016 |
| WO | 2017/180099 A1 | 10/2017 |
| WO | 2019/032617 A1 | 2/2019 |

* cited by examiner

RING FOR USE IN NEAR FIELD COMMUNICATION (NFC) AND METHOD OF MAKING SAME

CROSS REFERENCE TO RELATED APPLICATIONS

This application claims priority to U.S. provisional patent application Ser. No. 62/845,019, filed May 8, 2019, which is herein incorporated by reference in its entirety.

TECHNICAL FIELD

The invention relates generally to the field of jewelry and more specifically to a ring having a near field communication (NFC) antenna following an inner contour of a metallic band, and a method of making a ring for use in near field communication (NFC), which includes a metallic band substantially covering an NFC antenna.

BACKGROUND OF THE INVENTION

Recently, jewelry has been adapted for use with near field communication (NFC) technologies. Near field communication (NFC) is a more finely-honed version of radio frequency identification (RFID). NFC operates within a maximum range of about 4-10 cm and involves the modulation of a magnetic field between two devices, commonly referred to as an initiator and target. The initiator generates a radio frequency field and the target modulates the generated field using power from the initiator. NFC-enabled features are now commonly integrated into smart phones and other electronic devices.

A challenge with NFC antenna design is that performance of the NFC antenna is significantly degraded when surrounding the NFC antenna with metals or other electrically conductive materials. Specifically, wrapping a metal around and along a same plane as an NFC antenna prevents communication between initiator and target. To this end, U.S. Pat. No. 9,824,310 by Huynh discloses an article of jewelry where the NFC antenna is positioned within the bezel of an article of jewelry and the bezel includes opposing ends that are flanged outward, which prevents interference. Moreover U.S. Pat. No. 10,108,900 by Huynh provides an article of jewelry, where the NFC antenna is positioned within the bezel and the bezel is opened and closed to deny and permit near field communication between initiator and target by breaking and forming a continuous electrically conductive loop respectively.

While the state of the art demonstrates NFC antennas have been successfully positioned at the bezel, NFC antennas have not yet been successfully positioned over the band portion of a ring. This is because the band is conventionally formed as a continuous loop of an electrically conductive metal, which as indicated above, prevents near field communication. Accordingly, there remains a need to adapt the band portion of a ring for use with near field communication.

SUMMARY OF THE INVENTION

The present invention addresses the above challenges and newly presents a ring having a near field communication antenna following the inner contour of a metallic band, and a method of making a ring for use in near field communication (NFC), where the NFC coil follows the inner contour of a metallic band. That is, the NFC ring, even with its electrically conductive band, is capable of sending, storing and receiving electronic data through near field communication.

The above is accomplished in one aspect of the invention, by way of a ring capable of near field communication, the ring including an electrically non-conductive sleeve wrapped with an NFC coil, which itself includes an NFC antenna and NFC chip. The NFC coil is covered by, but spatially separated from an electrically conductive band, which has two ends separated by a through slit. The NFC antenna has two folds that are on a same plane but folded in opposite directions (a Z-fold), thereby fitting the NFC coil directly against the sleeve. By maintaining the through slit, the NFC ring is able to communicate with an NFC enabled device that acts as an initiator during near field communication. Further, the folding of the NFC antenna permits a same NFC coil to fit snuggly against sleeves having different sizes.

In a related aspect of the invention, a method of making a ring capable of near field communication (NFC) is also provided, the method including the steps of: providing an electrically conductive band for a ring, the band having two ends separated from one another by a through slit; fitting an NFC coil, defined by an NFC antenna and chip, against a sleeve, where the sleeve has a smaller circumference than the NFC coil prior to fitting and is non-conductive; and attaching the sleeve to the inside of the band, thereby forming an NFC enabled ring.

In some embodiments, the NFC coil is shortened to fit against an outer circumference of the sleeve by applying two folds to the NFC antenna that are on a same plane but in opposite directions (Z-fold). In some embodiments, the NFC coil is fitted against a recess over an outer circumference of the sleeve.

The NFC coil is preferably covered with an epoxy resin or an adhesive that is not electrically conductive, which can provide a protective barrier against the electrically conductive band and can assist with adhering the sleeve to the band to form the NFC ring. In some embodiments, the sleeve is attached to the band by an adhesive and only the recessed region of the sleeve receives the adhesive.

In the articles of manufacture and methods described herein, the band is formed of an electrically conductive material, such as a metal, metal alloy, gold or silver and the through slit is maintained in the NFC ring, such as by fixedly adhering the band to the sleeve so that opposing ends of the band remain spaced from one another.

BRIEF DESCRIPTION OF THE DRAWINGS

Embodiments of the invention can be better understood with reference to the following drawings, which form part of the specification and represent preferred embodiments. The components in the drawings are not necessarily to scale, emphasis instead being placed upon illustrating the principles of the invention. And, in the drawings, like reference numerals designate corresponding parts throughout the several views.

DETAILED DESCRIPTION OF PREFERRED EMBODIMENTS

Figure 1A:
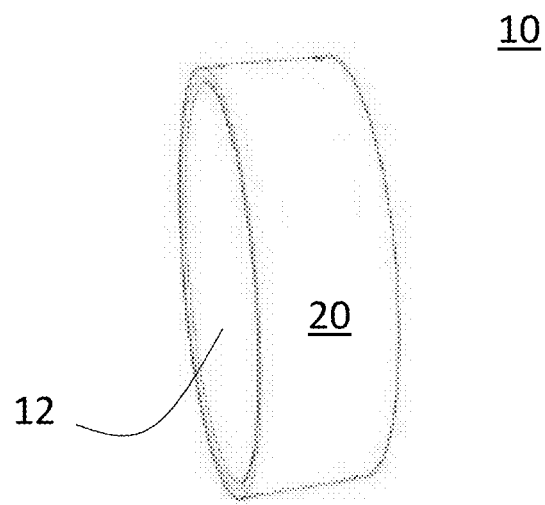
FIG. 1A is a perspective view showing an NFC ring 10.

For clarity of disclosure, and not by way of limitation, the invention is discussed according to different detailed embodiments; however, the skilled artisan will recognize through the guidance herein that features of one embodiment can be combined with other embodiments and therefore such combinations are within the intended scope of the invention.

Unless defined otherwise, all technical and scientific terms used herein have the same meaning as is commonly understood by one of ordinary skill in the art to which this invention belongs. If a definition set forth in this document is contrary to or otherwise inconsistent with a definition set forth in the art, the definition set forth in this document prevails over a contradictory definition.

The terms "band", "band of a ring", and "ring band" as used herein refer to the portion of a ring that encircles the finger when worn. The "band" can also be referred to as a shank in the jewelry industry.

The terms "conductive" and "electrically conductive" as used herein refer to materials that conduct electricity to a sufficiently high degree that, if on a same plane as an NFC coil and encircling the NFC coil, the material would prevent near field communication between initiator and target. The most electrically conductive element is silver, followed by copper and gold, each of which is highly electrically conductive. The SI unit for conductivity S/m. As used herein "conductive" or "electrically conductive" refers to a material having a conductivity of at least about $10^6$ S/m but preferably at least $10^7$ S/m.

The term "nonconductive" as used herein refers to a material that if completely surrounding an NFC coil would not prevent near field communication with the NFC coil. "Nonconductive" materials are also termed insulators. "Nonconductive" materials can include various polymers including plastics, rubbers, glass and ceramics. As used herein, "nonconductive" materials have a conductivity of less than $10^2$ S/m, but preferably less than about $10^{-5}$ S/m, and more preferably $10^{-14}$ S/m or less.

The term "conductivity" as used herein refers to electrical conductivity at about 20° C. The conductivity of a sampling of materials is provided in TABLE 1.

TABLE 1

| Material | Conductivity (S/m at 20° C.) |
| --- | --- |
| Silver | $6.30 \times 10^7$ |
| Copper | $5.96 \times 10^7$ |
| Gold | $4.10 \times 10^7$ |
| Aluminum | $3.50 \times 10^7$ |
| Tungsten | $1.79 \times 10^7$ |
| Zinc | $1.69 \times 10^7$ |
| Nickel | $1.43 \times 10^7$ |
| Iron | $1 \times 10^7$ |
| Platinum | $9.43 \times 10^6$ |
| Tin | $9.17 \times 10^6$ |
| Carbon steel | $6.99 \times 10^6$ |
| Titanium | $2.38 \times 10^6$ |
| Stainless steel | $1.45 \times 10^6$ |
| Glass | $1 \times 10^{-11}$ to $10^{-15}$ |
| Rubber | $1 \times 10^{-14}$ |
| Fused quartz | $1.30 \times 10^{-18}$ |

The term "near field communication coil" or "NFC coil" as used herein refers to a near field communication chip (NFC chip) connected to a near field communication antenna (NFC antenna), which acts as a target during near field communication. The term "near field communication chip" or "NFC chip" as used herein refers to an unpowered chip capable of acting as a passive target under near field communication standards as known in the electronic communication arts. Near field communication typically operates within a distance of about 4-10 cm or less and at a frequency of about 13.56 MHz. Near field communication operates using electromagnetic induction between two loop antennas located within each other's near field, effectively forming an air-core transformer between an initiator and target. More specifically an initiator device provides a carrier field, and the target device answers by modulating the existing field. Thus, the NFC chip draws its operating power from the initiator-provided electromagnetic field. An "NFC enabled device" as used herein refers to a device such as a smart phone or a tablet computer that acts as an initiator to power the NFC chip. NFC chips have a memory that currently stores between about 96 bytes and 4 MB. NFC chips can be read only but are preferably rewritable. Reading and writing to an NFC chip can be performed using an NFC enabled device loaded with NFC software. The term "NFC coil" and "NFC chip" and "NFC antenna" are intended to encompass current near field communication standards as well as further improvements that can operate in connection with remaining elements that form the ring.

The term "covering" as used herein refers to a layer that is positioned at least partly over another layer. The term "covering" does not require direct contact between layers.

The term "inside" when referring to the band, sleeve or NFC coil refers to the inside surface and not an internal cavity. The term "outside" when referring to the band, sleeve or NFC coil refers to the outer surface as opposed to the inside surface.

Figure 1B:
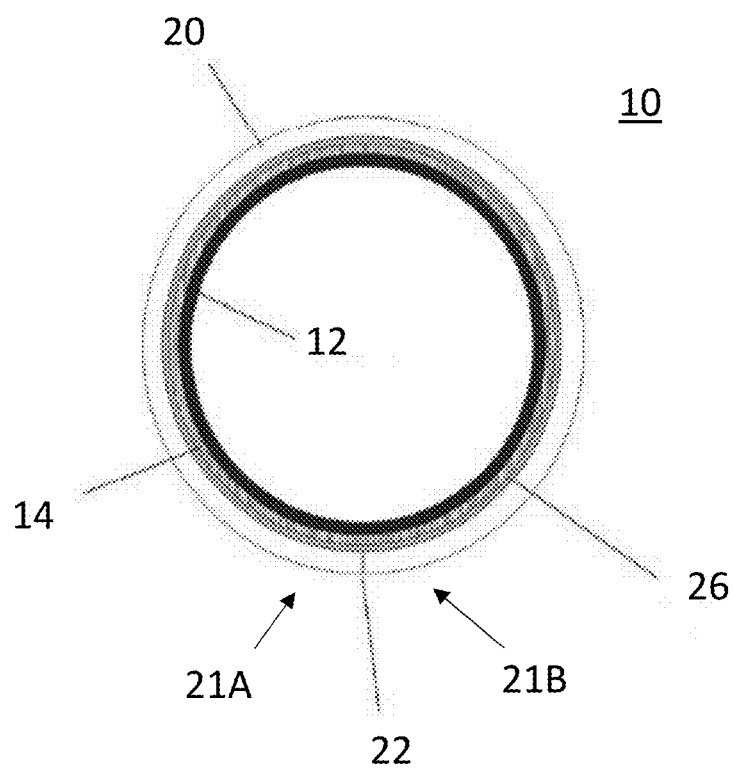
FIG. 1B is a cutaway side view of the NFC ring 10 shown in FIG. 1A.
Figure 2:
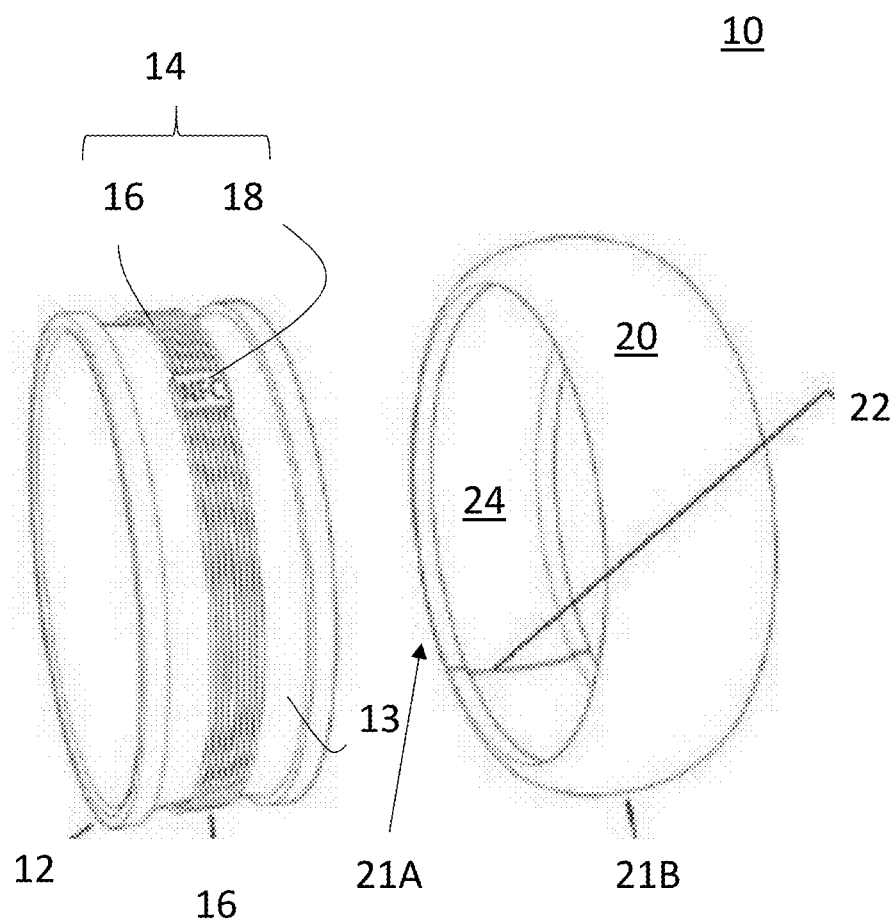
FIGS. 2-4 are partially exploded views of a ring 10.

Beginning now at FIGS. 1A-2, by way of introduction, the invention provides a ring 10 capable of near field communication and a method of making a ring 10 that permits NFC communication with an NFC enabled device. The ring 10 includes a non-conductive sleeve 12 wrapped with an NFC coil 14, which itself includes an NFC antenna 16 and NFC chip 18. The NFC coil 14 is covered by, but not in direct contact with, an electrically conductive band 20, with two ends 21A, 21B of the band 20 being separated from one another by a through slit 22. This through slit 22 prevents the electrically conductive band 20 from interfering with near field communication between the ring 10 and an NFC enabled device, such as a suitable smart phone. As shown in FIG. 5B, the NFC coil 14 is fitted against the sleeve 12 by two folds 17A, 17B of the NFC antenna 16, which preferably form of a Z-fold and thus characterized as being on a same plane but in opposite directions of one another. The folding permits the diameter of the NFC coil 14 to be reduced for tight fitting against the sleeve 12 and also permits a same NFC coil 14 to be used for differently sized sleeves 12 and thus rings 10. To this end, the invention also provides use of a same NFC coil 14 for different sized sleeves 12, which includes a step of folding the NFC coil 14 for fitting against a chosen sleeve 12 among a plurality of different sized sleeves 12.

As shown more clearly in FIG. 2, the band 20, which is formed from a conductive material, has two ends 21A, 21B separated from one another by a through slit 22. The through slit 22 must be a complete through slit 22 or gap to prevent the NFC ring 10 from having a continuous electrical loop around and on a same plane as the NFC coil 14. It has been found that breaking this continuous electrical loop permits near field communication between the NFC coil 14 and an NFC enable device. Since a continuous electrical loop around the NFC coil 14 is avoided, the band 20 can be formed from a variety of electrically conductive materials used in the jewelry arts. Non-limiting examples of electrically conductive materials that can be used include gold and silver. Accordingly, in some embodiments the band 20 is formed from a metal or an alloy of one or more metals. The artisan will appreciate that the NFC rings 10 and methods of making NFC rings 10 are non-limiting in regard to methods of alloying metals.

The through slit 22 can be formed by cutting or slicing a circular band 20. Further, it has been found that the through slit 22 only need be a couple millimeters wide to prevent interference of near field communication from a band 20 formed from gold or silver. Thus, it is preferred that the through slit 22 be at least two millimeters and that direct contact between opposing cut ends 21A, 21B of the band 20 be prevented. In other embodiments the through slit 22 provides 3-5 millimeters between the ends 21A, 21B.

Figure 3:
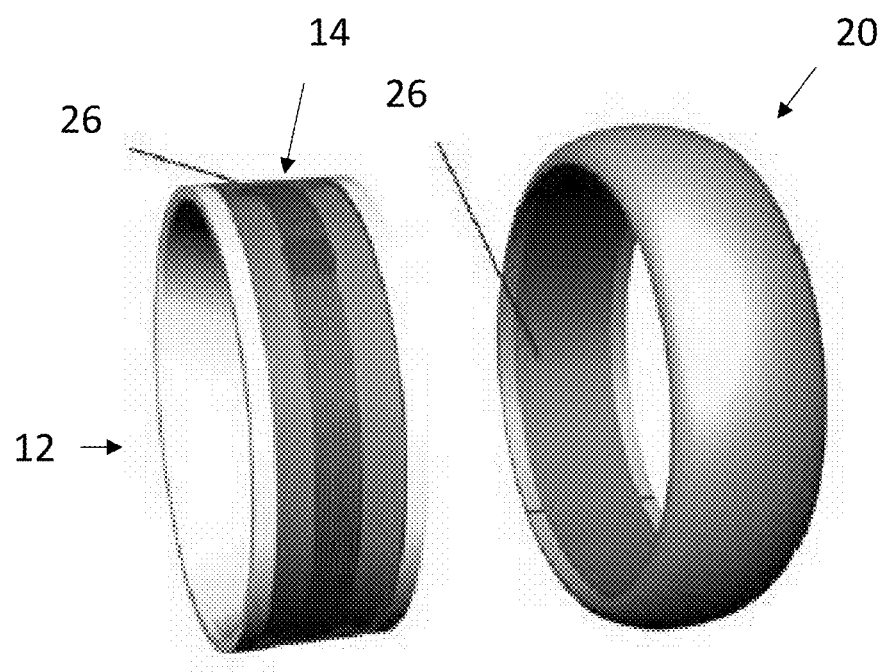

Also shown in FIG. 2, the band 20 may have an indent 24 or a concave shape along its inside surface. This indent 24 or concave surface may provide a gap between the NFC coil 14 and the band 20 after insertion of the sleeve 12. As shown in FIG. 3, the indent 24 or concave shape may provide a surface for applying an adhesive, such as an epoxy resin 26 when attaching the sleeve 12 to the band 20. Furthermore, the indent 24 or concave surface may reduce the tolerances needed for insertion of the sleeve 12 with wrapped NFC coil 14 into the band 20.

Figure 4:
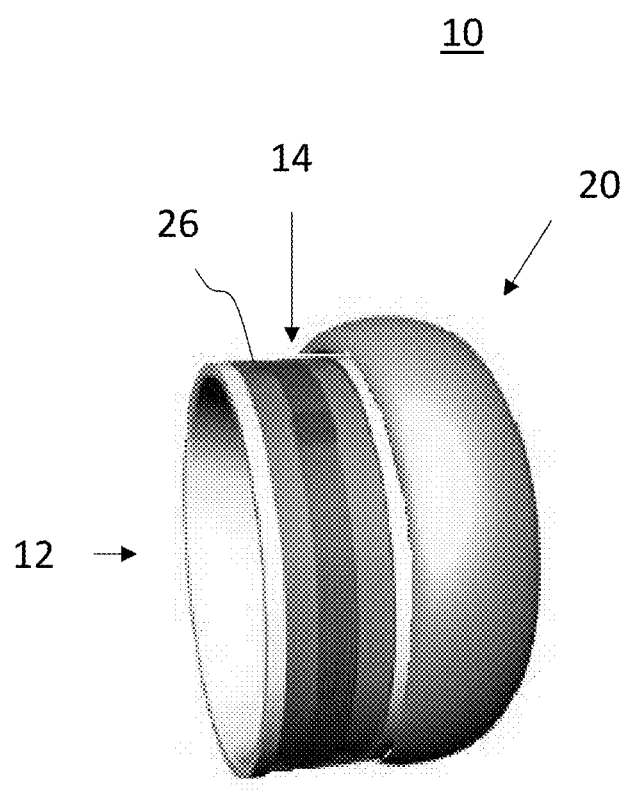

The sleeve 12 is formed from a non-conductive material. Examples of suitable materials include various polymers and plastics. The sleeve 12 can provide multiple functions. For example, the sleeve 12 acts as a physical barrier between the NFC coil 14 and a finger inserted into the NFC ring 10, thereby protecting the fragile NFC coil 14 from breaking. In addition, the sleeve 12 provides a substrate against which the NFC coil 14 can be wrapped to add rigidity to the NFC coil 14. Still further, as shown more clearly in FIG. 4, the sleeve 12 can be shaped to optimize the sleeve's 12 fit with the band 20 and ensure the outer contour of the NFC enabled ring 10 is continuous and smooth. Still further, as shown in FIG. 1B, the sleeve 12 provides rigidity to the NFC ring 10, which allows the opposing ends 21A, 21B of the band 20 be held only slightly away from one another, such as only a few millimeters apart, even when a compressive force is applied to the NFC ring 10, thereby ensuring near field communication.

Figure 5A:
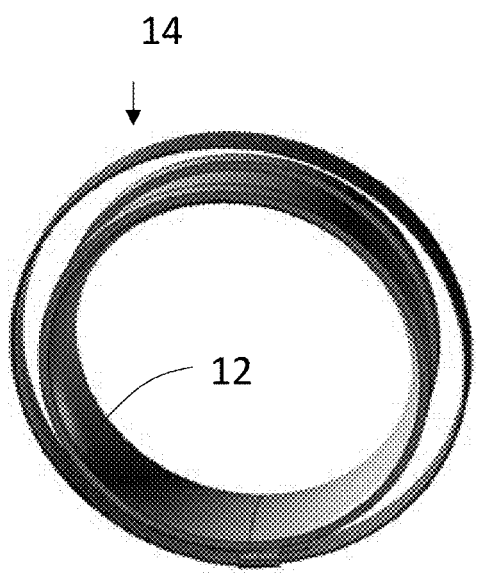
FIGS. 5A-5C show a method of fitting an NFC coil 14 to a continuous, non-conductive sleeve 12.
Figure 5B:
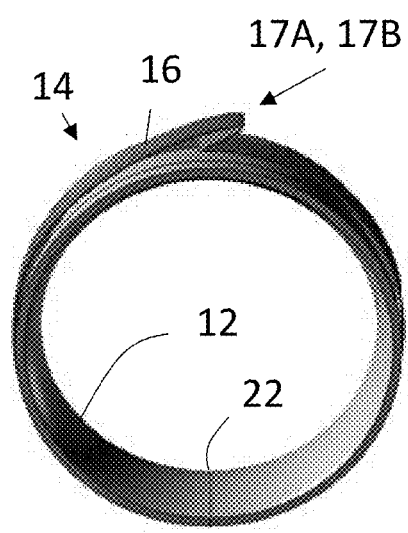

As shown in FIG. 5A, the size of an NFC coil 14 is often substantially larger in diameter than the diameter of the sleeve 12. In some embodiments, the diameter of the NFC coil 14 is 1-5% larger than the diameter of the sleeve 12. In other embodiments the NFC coil 14 is 5-10% larger in diameter than the sleeve 12. In other embodiments the NFC coil 14 is 10%-15% larger in diameter than the sleeve 12. In other embodiments the NFC coil 14 is 15%-20% larger in diameter than the sleeve 12. In other embodiments the NFC coil 14 is 20%-25% larger in diameter than the sleeve 12. In other embodiments the NFC coil 14 is between 25% to 45% larger in diameter than the sleeve 12. On the one hand, this larger diameter assists with fitting sleeves 12 of different diameters (for different sized fingers) through the NFC coil 14 during fitting. However, on the other hand, this larger diameter makes attaching the NFC coil 14 to the sleeve 12 difficult. That is, it is preferred to have the inner surface of the NFC coil 14 lay directly against a solid surface; however, altering an NFC coil 14 to such a tight tolerance makes positioning the NFC coil 14 over the sleeve 12 difficult. If the NFC coil 14 is twisted it risks breaking.

Figure 5C:
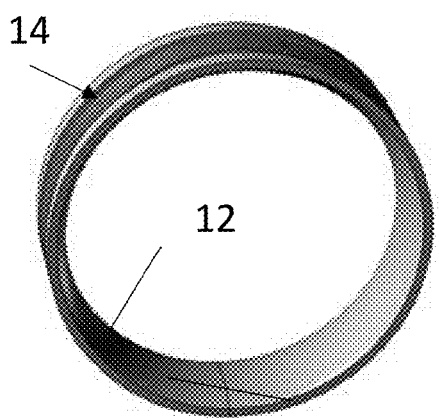

As shown in FIGS. 5A-5C, the technical challenge of securely fitting an NFC coil 14 with a larger diameter against a sleeve 12 with a smaller diameter is solved in one embodiment, by applying two folds 17A, 17B to the NFC antenna 16, these two folds 17A, 17B are preferably a Z-fold, which is characterized as being on a same plane but in opposite directions. As such, fitting the NFC coil 14 against a continuous sleeve 12 can be accomplished by inserting the sleeve 12 through the NFC coil 14, and folding the NFC antenna 16 to reduce the diameter of the NFC coil 14 to about that of the outer surface of the sleeve 12, thereby establishing contact along an entire outer circumference of the sleeve 12. Applying an adhesive to the sleeve 12 or to the wrapped sleeve 12 can help keep the NFC coil 14 from sliding. FIG. 5C shows the resulting tight fit of the NFC coil 14 to the sleeve 12 after folding.

Turning back to FIG. 2, in preferred embodiments, the sleeve 12 has a recess 13 for positioning the NFC coil 14. As such, the method of making an NFC ring 10 may include providing a sleeve 12 with a recess 13 and then fitting an NFC coil 14 within the recess 13 and against the sleeve 12. Naturally, it would be preferred for the recess 13 to be wider than the NFC coil 14. Still more preferably, as shown in FIGS. 2 and 3 collectively, the recess 13 provides additional space for layering an adhesive or other epoxy resins 26 over the NFC coil 14 to further protect the NFC coil 14 or to assist with bonding to the band 20. That is, placement or attachment of non-conductive materials in this additional space created by the recess 13 can act as a non-conductive barrier positioned between both the conductive band 20 and the NFC coil 14.

Again, as shown in FIGS. 3-5C, once the NFC coil 14 is wrapped and folded against the sleeve 12, it is preferably coated with an epoxy resin 26 and adhered to the band 20 to form the NFC enabled ring 10. Once adhered, the sleeve 12 provides additional structural support to the band 20 and therefore prevents the ends 21A, 21B of the band 20 from contacting one another. In some embodiments, the through slit 22 is then filled with a non-conductive material such as a non-conductive glue or polymer.

In view of the above disclosure, the invention may be embodied in other specific forms without departing from the spirit or essential characteristics thereof. The specific embodiments previously described are therefor to be considered as illustrative of, and not limiting, the scope of the invention.

What is claimed is:

1. A method of making a ring capable of near field communication (NFC), the method comprising the steps of:
   a) providing an electrically conductive band for a ring, the band having two ends separated from one another by a through slit;
   b) fitting an NFC coil comprising an NFC antenna and NFC chip against a continuous sleeve, wherein the sleeve is smaller in circumference than the NFC coil and is non-conductive; and
   c) attaching the sleeve to the inside of the band so that the two ends remain separated from one another, thereby forming an NFC enabled ring.

2. The method of claim 1, wherein the NFC coil's diameter is shortened to fit against an outer circumference of the sleeve by applying two folds to the NFC antenna that are on a same plane but in opposite directions.

3. The method of claim 1, wherein the NFC coil is fitted against an indent along an outer circumference of the sleeve.

4. The method of claim 1, wherein the NFC coil is covered with an epoxy resin or an adhesive that is not electrically conductive.

5. The method of claim 1, wherein the sleeve is attached to the band by an adhesive and only the indent of the sleeve receives the adhesive.

6. The method of claim 1, wherein the band is formed of a metal selected from a group consisting of gold or silver.

7. The method of claim 1, wherein the through slit of the ring is filled with a non-conductive material.

8. A ring capable of near field communication, the ring comprising a non-conductive sleeve wrapped with an NFC coil comprising an NFC antenna and chip, the NFC coil covered by an electrically conductive ring band with two ends separated by a through slit, characterized in that the NFC antenna comprises two folds that are on a same plane but in opposite directions, thereby fitting the NFC coil directly against the sleeve.

\* \* \* \* \*